United States Patent [19]

Solove et al.

[11] Patent Number: 5,382,202
[45] Date of Patent: Jan. 17, 1995

[54] AUTOMATIC TRANSMISSION CONTROL SYSTEM AND METHOD

[75] Inventors: Jeffrey A. Solove, Blacklick; Thomas D. Buchanan, Newark; Richard L. Irvin; Terry R. Toops, both of Columbus, all of Ohio

[73] Assignee: Barney & White Auto Parts, Inc., Columbus, Ohio

[21] Appl. No.: 30,839

[22] Filed: Mar. 12, 1993

[51] Int. Cl.6 .............................................. F16H 5/46
[52] U.S. Cl. ................................... 475/124; 74/336.5
[58] Field of Search ............... 74/336.5; 475/118, 120, 475/124

[56] References Cited

U.S. PATENT DOCUMENTS

| | | | |
|---|---|---|---|
| 1,998,274 | 4/1935 | Drabin | 74/336.5 |
| 2,720,793 | 10/1955 | Linsley | 74/863 |
| 2,882,743 | 4/1959 | Ebert | 74/336.5 |
| 2,961,884 | 11/1960 | Bauer | 74/336.5 |
| 3,106,104 | 10/1963 | Harry | 74/844 |
| 3,165,008 | 1/1965 | Forster | 74/863 |
| 3,448,767 | 6/1969 | Wonn | 137/595 |
| 3,599,513 | 8/1971 | Buno et al. | 74/877 |
| 4,291,595 | 9/1981 | Jelaca | 74/863 |
| 4,331,045 | 5/1982 | Piech et al. | 74/867 |
| 4,467,674 | 8/1984 | van Deursen et al. | 74/867 |
| 4,468,987 | 9/1984 | Miller | 475/124 |
| 4,621,544 | 11/1986 | Re | 74/863 |
| 4,827,803 | 5/1989 | Miyawaki | 74/866 |

Primary Examiner—Dirk Wright
Attorney, Agent, or Firm—Mueller and Smith

[57] ABSTRACT

An control system and method for an automatic transmission are disclosed which are adapted to shift or actuate the gears of the transmission without engine vacuum assistance. A control valve is provided which is variably positionable in response to a pressure signal from a governor to select control positions controlling the flow of hydraulic fluid to the gear shift elements of the transmission. The control valve is biased at a first select control position and is movable in response to the pressure signal from the governor to a second select control position for providing hydraulic fluid to the gear shift elements at a pressure effective for actuating the elements at a preselect vehicle speed. An adjustable position delimiter maintains the control valve at the second preselect control position.

20 Claims, 1 Drawing Sheet

AUTOMATIC TRANSMISSION CONTROL SYSTEM AND METHOD

BACKGROUND OF THE INVENTION

The present invention relates broadly to a control system and method for an automatic transmission adapted to shift the transmission without vacuum assistance.

Vehicle transmissions of the automatic variety generally comprise a torque converter and a compound planetary gear set controlled by clutches and bands which provide the frictional elements necessary to the shift the transmission from one gear to another. The torque converter supplements the gear set by multiplying engine torque. The torque converter and clutches couple the engine to the planetary gears through oil pressure to typically provide up to three forward speeds as well as a reverse speed.

The transmission is generally controlled by a hydraulic system. Hydraulic pressure is supplied by a transmission oil pump which typically is engine driven and an associated line system. Main line pressure from the pump to the transmission is controlled by a pressure regulator valve in the pump and by a vacuum modulator connected to the engine to provide an engine vacuum signal. The main line pressure is the activating power of the transmission and is supplied to apply or release bands and to control clutches, servos, sprags, valves, governors, and the like which, in turn, control the gear changes which upshift or downshift the transmission. For example, whenever the engine of the vehicle is running at idle speed with the selector lever or prindle in either the "park" or the "neutral" position, no line pressure is directed to any of the mechanical units in the transmission. Accordingly, all clutches and bands are released. When, however, the selector lever is placed in the "drive" position and the vehicle commences movement into first speed, line pressure is directed to, for example, a forward clutch where it acts upon the clutch piston to apply the forward clutch and thereby place the transmission in low gear. The pressure regulator controls line pressure such that the torque requirements of the transmission clutches are met and the proper shift spacing is obtained at all throttle openings.

The vacuum modulator controls main line pressure via a valve which supplies a modulator pressure to the hydraulic system that is proportional to engine torque and to vehicle speed. The modulator pressure is used to vary the shift points of the transmission in correspondence with the opening of a throttle and to raise hydraulic line pressure proportional to engine torque. The modulator valve is biased by an evacuated bellows, a diaphragm and a spring so arranged that the bellows and the spring apply a force to the valve to increase modulator pressure. Engine vacuum and fluid pressure from a governor provided in proportion to vehicle speed act on the modulator valve in a manner which opposes the bellows to thereby decrease modulator pressure as the speed of the vehicle increases. A more detailed description of vacuum modulators, governors, and of automatic transmissions in general may be had by reference to U.S. Pat. Nos. 3,106,104, 3,165,008, 4,291,595, 4,621,544, and to *Motor's Automatic Transmission Manual* (4th ed. 1971), the disclosures of which are expressly incorporated herein by reference.

However, to properly control the line pressure, the modulator pressure must vary in proportion to the torque input to the transmission. Inasmuch as torque input to the clutches is a product of engine torque and converter ratio, modulator pressure must compensate for changes in either or both. Accordingly, modulator pressure is regulated by engine vacuum which is an indication of engine torque and carburetor opening. Modulator pressure thus is provided to decrease with an increase in vehicle speed to compensate for a change in converter torque ratio.

In view of the foregoing, it may be appreciated that the vacuum modulator as controlled by the governor and by engine vacuum has heretofore been an integral part of the automatic transmission. However, in vehicles such as trucks and the like powered by combustion engines of the diesel variety, no engine vacuum is available with which to drive a modulator. Although such vehicles may be provided with a vacuum pump to develop the necessary pressure differential, vacuum pumps and the associated lines and cables involve a significant expense and require considerable maintenance to assure operability. Moreover, it is often desirable to retrofit a truck or the like having a worn or blown gasoline engine with an engine of the more economical diesel variety. Heretofore, such a retrofit has required the addition of the aforementioned vacuum pump and its associated lines, or the replacement of the transmission. Both these alternatives, however, are objectionable from an economic standpoint. Accordingly, a need has existed which, as of yet, has been left unmet for a control system adapted to shift or actuate the gears of an automatic transmission without vacuum assistance.

BROAD STATEMENT OF THE INVENTION

The present invention is addressed to a control system and method for an automatic transmission which are adapted to shift or actuate the gears of the transmission without engine vacuum assistance and without external assistance from cables, levers, or the like attached to and actuated by, for example, an accelerator pedal. By providing a control valve which is variably positionable in response to a pressure signal from a governor and an adjustable position delimiter for maintaining the control valve at a control position effective for providing hydraulic fluid to the gear shift elements of the transmission at a pressure effective for actuating the elements at a preselected vehicle speed, the present invention obviates the need for a vacuum modulator. Accordingly, the invention may be employed in vehicles such as trucks and the like powered by diesel engines which develop no engine vacuum with which to power a vacuum modulator. As a result of the present invention, a worn or blown gasoline engine may be replaced with a more economical diesel engine without necessitating the addition of a costly vacuum pump and its associated vacuum lines or the replacement of the transmission. Moreover, a diesel engine having a failing vacuum pump or a gasoline engine developing vacuum problems may be economically repaired by incorporating the present invention into the existing transmission system of the vehicle.

It is, therefore, an object of the present invention to provide a control system for controlling the pressure of hydraulic fluid delivered to the gear shift elements of a transmission. A governor is provided to derive a pressure signal proportional to the speed of the vehicle. A control valve is responsive to this pressure signal and is movable along an axis in correspondence therewith to select control positions controlling the flow of the hydraulic fluid to the gear shift elements. The control valve is biased at a first select control position and is movable in response to the pressure signal to a second select control position for providing hydraulic fluid to the gear shift elements at a pressure effective for actuating the elements at a preselect vehicle speed. An adjustable position delimiter maintains the control valve at the second preselect control position.

It is also an object of the invention to provide in a vehicle having a pump for supplying a pressurized hydraulic fluid to an automatic transmission having a mechanical planetary gear train with gear shift elements actuable in response to the pressure of said hydraulic fluid, a method for controlling the pressure of the hydraulic fluid provided to the gear shift. The method entails providing the transmission with a control assembly having: a governor for deriving a pressure signal proportional to the speed of said vehicle; a cylindrical control valve movable along a longitudinal axis in response to the governor pressure signal to select control positions controlling the flow of the pressurized hydraulic fluid to the gear shift elements; a biasing member for normally biasing the control valve at a first select control position; and an adjustable position delimiter for maintaining the control valve at a second select control position effective for providing hydraulic fluid to the gear shift elements at a pressure effective for actuating the elements at a preselect vehicle speed. The control valve is then biased at the first select control position and the position delimiter is adjusted to maintain the control valve at the second select control position. The governor pressure signal is then derived and the control valve is moved in correspondence therewith from the first select control position to the second select control position.

The invention, accordingly, comprises the apparatus and method possessing the construction, combination of elements, arrangement of parts and steps which are exemplified in the following detailed disclosure.

For a fuller understanding of the nature and objects of the invention, reference should be had to the following detailed description taken in connection with the accompanying drawings.

DETAILED DESCRIPTION OF THE INVENTION

Figure 1:
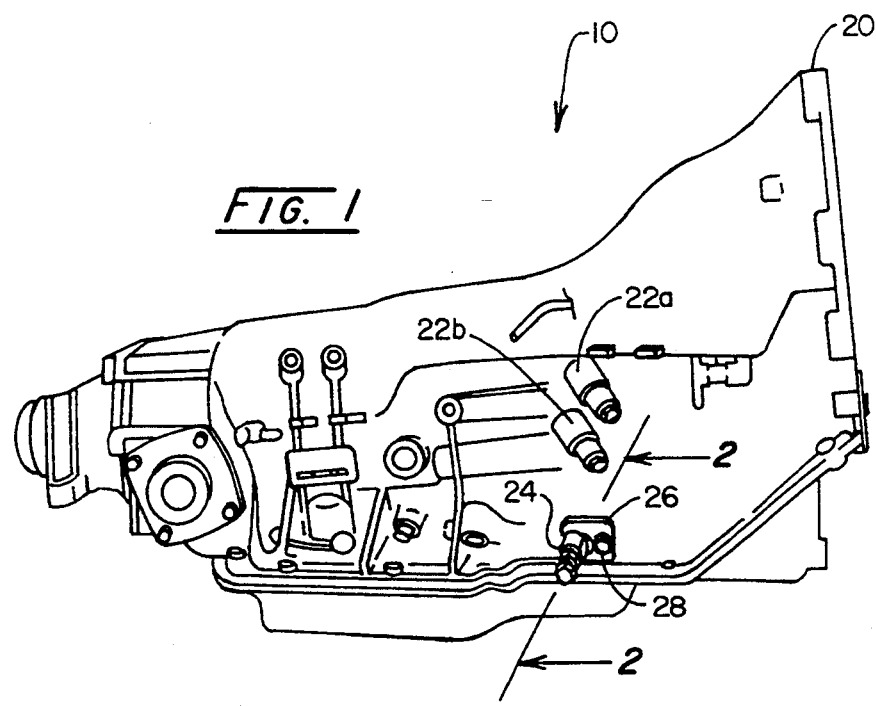
FIG. 1 is a partial side elevational view of an automatic transmission having a control assembly mounted thereon in accordance with the present invention.

Referring to FIG. 1, an automatic transmission is shown generally at 10 to comprise a housing, 20. Housing 20 may be seen as having a number of pressure taps, 22a and b, for measuring line pressures. Pressurized hydraulic fluid is supplied to transmission 20 via an external pump and piping (not shown). In accordance with the precepts of the present invention, a control assembly, 24, is mounted onto housing 20 via a bolt, 26, and a flanged plate, 28.

Figure 2:
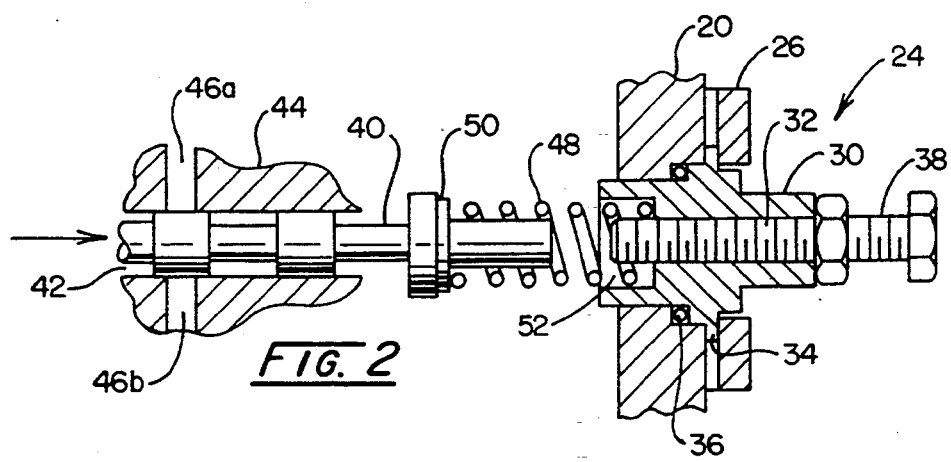
FIG. 2 is a cross-sectional view of the control assembly shown in FIG. 1 taken through reference line 2—2 of FIG. 1.

Looking to FIG. 2, control assembly 24 is illustrated in enhanced detail. Advantageously, control assembly 24 may be configured to be received by a transmission housing adapted to receive a vacuum modulator By so configuring control assembly 24, a transmission may be retrofitted with the control system of the instant invention. Accordingly, a diesel engine may be substituted into a vehicle previously employing a gasoline powered engine without necessitating replacement of the existing transmission or the addition of an external vacuum pump and its associated vacuum lines. Moreover, control assembly 24 may be substituted for the vacuum modulator of a gasoline engine generating insufficient vacuum due to wear or the like to power the modulator or for a failing vacuum pump of a diesel engine.

Control assembly 24 may be seen to comprise a generally cylindrical housing, 30, having an internally-threaded bore, 32, extending therethrough. Cylindrical housing 30 may have a flange, 34, to provide a compressive fit between plate 26 and transmission housing 20. To ensure a seal between flange 34 and transmission housing 20, an O-ring, 36, may be disposed over cylindrical housing 30 for interposition between flange 34 and transmission housing 20. Preferably, O-ring 36 is constructed from an elastomeric material having resistance to the deteriorating effects of hydrocarbons, solvents, and the like.

For the setting of hydraulic line pressures at predetermined vehicle speeds or engine revolutions, an externally-threaded, elongate stop member, 38, is threadably engaged with the internal threads of cylindrical housing 30 and is movable therethrough to provide a variable or adjustable position delimiter for a control valve, 40. Advantageously, control valve 40 may be provided to be the modulator valve salvaged, for example, from the vacuum modulator for which control assembly 24 may be substituted. Control valve 40 is variably positionable within a passageway, 42, of a manifold, 44, having a plurality of inlet and outlet ports, 46a and b, through which pressurized hydraulic fluid flows to the gear shift elements (not shown) of transmission 10. By adjusting the position of control valve 40 within passageway 42 in response to preselect vehicle speeds, the pressure of the hydraulic fluid provided to the gear shift elements may be controlled to cause their actuation for the shifting the planetary gears of transmission 10.

For example, in a vehicle having a Turbo Hydra Matic 400 TM transmission, it is preferred that position delimiter 38 is set to maintain control valve 40 at a position within passageway 42 effective to develop a reverse line pressure of 225 to 240 psi at an engine speed of about 2000 rpm. This setting will effect a line pressure of 85 to 90 psi when the vehicle is in high gear at a vehicle speed of about 55 mph.

To normally bias control valve 40 at a position providing a predetermined fluid pressure to the gear shift elements at a preselected vehicle speed or vehicle gear selector setting, a helical spring, 48, is coaxially disposed over control valve 40 and stop member 38 and is interposed therebetween. Preferably, control valve 40 is provided with a shoulder, 50, for abutting engagement with an end of spring 48. It is also preferred that cylindrical housing 30 is provided with a counter bore, 52, configured to receive spring 48. Spring 48 is selected to have a spring constant effective for normally maintaining stop member 40 at a preselected position. For example, with the vehicle in park, spring 48 may be selected to maintain control valve 40 in a position effective for providing or, alternatively, for discontinuing hydraulic fluid pressure to the valves, servos, and the like controlling the fluid pressure to the clutch pistons of transmission 10.

Figure 3:
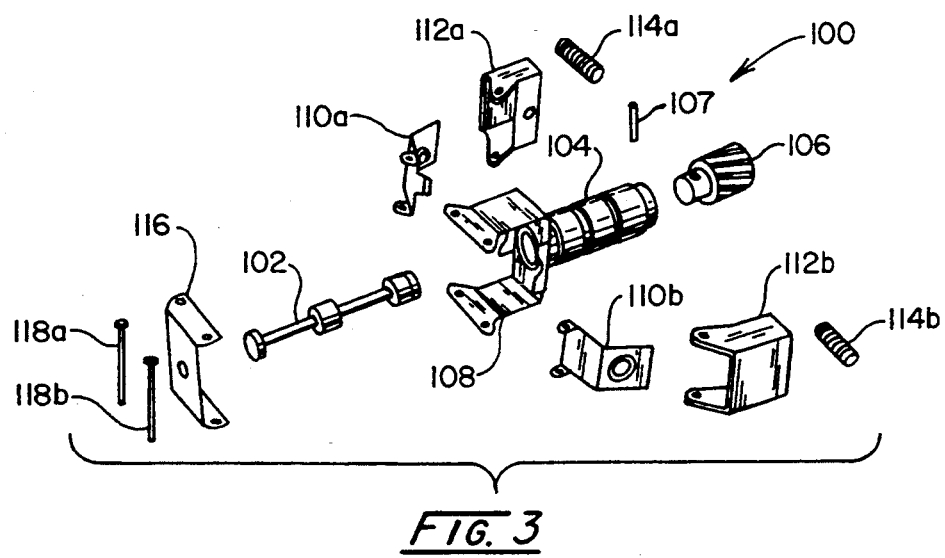
FIG. 3 is an exploded view of a governor in accordance with the present invention.

In order to provide a hydraulic pressure signal to control valve 40 in response to the speed of the vehicle for upshifting or downshifting transmission 10, control assembly 24 is associated with a governor which provides a hydraulic pressure signal proportional to vehicle speed. Referring to FIG. 3, a governor is shown generally at 100 to be comprised of a regulator valve, 102, coaxially disposed within a cylindrical housing, 104, which is in turn connected to a gear, 106, via a pin, 107, and to a U-shaped bracket, 108. Attached to bracket 108 are a pair of opposing lever arms, 110a and b, each having an associated flyweight, 112a and b, and a spring, 114a and b, connecting flyweights 112 and lever arms 110 to bracket 108. A support plate, 116, is provided through which pivot pins 118a and b are inserted to furnish axles on which lever arms 110a and b may rotate in response to a centrifugal force derived when housing 104 and flyweights 112a and b are rotated about regulator valve 102 as gear 106 is driven by an output shaft (not shown) of transmission 10.

In general operation, the position of regulator valve 102 is controlled by lever arms 106 which are normally biased in a generally upward position by springs 114. However, as gear 106 effects a rotation of housing 104 and flyweights 112 at an angular speed in correspondence with the speed of the vehicle, the rotation of flyweights 112 develops a centrifugal force having a generally downward vector which acts upon lever arms 110 to cause their rotation about pivots 118 to impose an opposing force upon regulator valve 102 effecting its position within housing 104. The position of regulator valve 102 is used to control the flow of hydraulic fluid to control valve 40 and to thereby provide thereto a pressure signal proportional to the speed of the vehicle. Control valve 40 is provided to have a position responsive to this pressure signal to control the flow of hydraulic fluid to the gear elements of transmission 10 which control the upshifting or downshifting of the vehicle. By providing control valve 40 to be responsive to a pressure signal from govenor 100, the present invention, advantageously, is able to effectuate the actuation of the gear shift elements of transmission 10 without external assistance from cables, levers, or the like attached to and actuated by, for example, an accelerator pedal.

In view of the foregoing, it may be appreciated that springs 114 and flyweights 112 of governor 100 are selected or tuned to operate in conjunction with spring 48 of control valve 40. That is the masses of the flyweights 112 and the spring constants of springs 114 and 48 are selected such that hydraulic fluid is provided to the gear shift elements of transmission 10 via control valve 40 and regulator valve 102 at a pressure effective for actuating the gear shift elements at predetermined vehicle speeds to determine the upshifting or downshifting of the vehicle.

Since certain changes may be made in the above-described apparatus and method without departing from the scope of the invention herein involved, it is intended that all matter contained in the description thereof or shown in the accompanying drawings shall be interpreted as illustrative and not in a limiting sense.

We claim:

1. In vehicle having a pump for providing a pressurized hydraulic fluid to an automatic transmission having a mechanical planetary gear train with gear shift elements actuable in response to the pressure of said hydraulic fluid, a transmission control system for controlling the pressure of said hydraulic fluid provided to said gear shift elements comprising:

a governor for deriving a pressure signal proportional to the speed of said vehicle;

a cylindrical control valve movable along a longitudinal axis in response to said governor pressure signal to select control positions controlling the flow of said pressurized hydraulic fluid to said gear shift elements, a biasing member for normally biasing said control valve at a first select control position; and an adjustable position delimiter for maintaining said control valve at a second select control position effective for providing said hydraulic fluid to said gear shift elements at a pressure effective for actuating said gear shift elements at a preselect vehicle speed.

2. The transmission control system of claim 1 wherein said biasing member comprises a helical spring interposed between said position delimiter and said control valve, said spring compressible by said control valve movement in response to said governor pressure signal and having a spring constant selected as effective to normally bias said valve at said first select control position.

3. The transmission control system of claim 1 wherein said governor comprises:

a cylindrical regulator valve having a rearward end and movable to preselect positions for regulating the flow of said hydraulic fluid to said control valve to provide said pressure signal;

a pair of opposing lever arms rotatable about an axis at an angular velocity proportional to the speed of said vehicle, each said lever arm having a forward end and a rearward end abuttingly engaging said regulator valve rearward end for moving said regulator valve to said preselect positions when said lever arms are actuated;

a pivot pin for each said lever arm disposed intermediate said forward and said rearward end, each said lever arm actuable about said pivot pin from a normally biased position to move said regulator valve to said preselect positions;

a flyweight mounted on each said lever arm having a mass selected as effective for deriving a centrifugal force when said lever arms are rotated to actuate said lever arms about said pivots; and a spring attached to each said lever arm having a spring constant selected as effective for normally maintaining said lever arms at said normally biased position defining a regulator valve first position and extensible in response to said centrifugal force derived by said flyweights to maintain said lever arms at a second position defining a regulator valve second position, said regulator valve second position providing a flow of said hydraulic fluid to said control valve effective for developing said pressure effective for actuating said gear shift elements at said preselect vehicle speed.

4. The transmission control system of claim 1 wherein said position delimiter comprises:

a cylindrical housing having a threaded bore extending longitudinally therethrough;

a cylindrical stop member threadably engagable with said cylindrical housing threaded bore and movable therethrough to define preselect delimiting positions, said stop member having a forward face abuttably engagable with a rearward face of said control valve for delimiting the movement thereof; and a locking nut threadably engagable with said stop member and having a forward face abuttably engagable with a rearward face of said cylindrical housing for locking said stop member at a said preselect delimiting position.

5. The transmission control system of claim 4 wherein said biasing member comprises a helical spring interposed between and mounted coaxially over said stop member and said control valve and compressible by said control valve movement in response to said governor pressure signal, said spring having a rearward end for abutting engagement with a forward face of said cylindrical housing, a forward end for abutting engagement with a rearward shoulder of said control valve, and a spring constant selected as effective to maintain said valve at said normally biased position.

6. The control system of claim 5 wherein said cylindrical housing forward face is counterbored for receiving a rearward portion of said helical spring.

7. The control system of claim 6 wherein said cylindrical housing is configured to be received by a transmission housing adapted to receive a vacuum modulator.

8. The control system of claim 7 further comprising an O-ring formed of an elastomeric material mountable over said cylindrical housing and compressible between said cylindrical housing and said transmission housing when said cylindrical housing is received by said transmission housing.

9. The control system of claim 7 wherein said control valve is a modulator valve.

10. The transmission control system of claim 5 wherein said governor comprises:

a cylindrical regulator valve having a rearward end and movable to preselect positions for regulating the flow of said hydraulic fluid to said control valve to provide said pressure signal;

a pair of opposing lever arms rotatable about an axis at an angular velocity proportional to the speed of said vehicle, each said lever arm having a forward end and a rearward end abuttingly engaging said regulator valve rearward end for moving said regulator valve to said preselect positions when said lever arms are actuated;

a pivot pin for each said lever arm disposed intermediate said forward and said rearward end, each said lever arm actuable about said pivot pin from a normally biased position to move said regulator valve to said preselect positions;

a flyweight mounted on each said lever arm having a mass selected as effective for deriving a centrifugal force when said lever arms are to actuate said lever arms about said pivots; and a spring attached to each said lever arm having a spring constant selected as effective for normally maintaining said lever arms at said normally biased position defining a regulator valve first position and extensible in response to said centrifugal force derived by said flyweights to maintain said lever arms at a second position defining a regulator valve second position, said regulator valve second position providing a flow of said hydraulic fluid to said control valve effective for developing said pressure effective for actuating said gear shift elements at said preselect vehicle speed.

11. In vehicle having a pump for providing a pressurized hydraulic fluid to an automatic transmission having a mechanical planetary gear train with gear shift elements actuable in response to the pressure of said hydraulic fluid, a method for controlling the pressure of said hydraulic fluid provided to said gear shift elements comprising the steps of:

(a) providing said transmission with a control assembly comprising:

a governor for deriving a pressure signal proportional to the speed of said vehicle;

a cylindrical control valve movable along a longitudinal axis in response to said governor pressure signal to select control positions controlling the flow of said pressurized hydraulic fluid to said gear shift elements, a biasing member for normally biasing said variable control valve at a first select control position; and an adjustable position delimiter for maintaining said control valve at a second select control position effective for providing said hydraulic fluid to said gear shift elements at a pressure effective for actuating said gear shift elements at a preselect vehicle speed;

(b) adjusting said position delimiter to maintain said control at said second select control position; and (c) deriving said governor pressure signal, whereby said control valve is moved from said first select control position to said second select control position in response to said governor pressure signal.

12. The method of claim 11 wherein said biasing member comprises a helical spring interposed between said position delimiter and said variable control valve and compressible by said control valve movement in response to said governor pressure signal, said spring having a spring constant selected as effective to normally bias said valve at said first select control position.

13. The method of claim 11 wherein said governor comprises:

a cylindrical regulator valve having a rearward end and movable to preselect positions for regulating the flow of said hydraulic fluid to said control valve to provide said pressure signal;

a pair of opposing lever arms rotatable about an axis at an angular velocity proportional to the speed of said vehicle, each said lever arm having a forward end and a rearward end abuttingly engaging said regulator valve rearward end for moving said regulator valve to said preselect positions when said lever arms are actuated;

a pivot pin for each said lever arm disposed intermediate said forward and said rearward end, each said lever arm actuable about said pivot pin from a normally biased position to move said regulator valve to said preselect positions;

a flyweight mounted on each said lever arm having a mass selected as effective for deriving a centrifugal force when said lever arms are rotated to actuate said lever arms about said pivots; and a spring attached to each said lever arm having a spring constant selected as effective for normally maintaining said lever arms at said normally biased position defining a regulator valve first position and extensible in response to said centrifugal force derived by said flyweights to maintain said lever arms at a second position defining a regulator valve second position, said regulator valve second position providing a flow of said hydraulic fluid to said control valve effective for developing said pressure effective for actuating said gear shift elements at said preselect vehicle speed.

14. The method of claim 11 wherein said position delimiter comprises:
   a cylindrical housing having a threaded bore extending longitudinally therethrough;
   a cylindrical stop member threadably engagable with said cylindrical housing threaded bore and movable therethrough to define preselect delimiting positions, said stop member having a forward face abuttably engagable with a rearward face of said control valve for delimiting the movement thereof; and
   a locking nut threadably engagable with said stop member and having a forward face abuttably engagable with a rearward face of said cylindrical housing for locking said stop member at a said preselect delimiting position.

15. The method of claim 14 wherein said biasing member comprises a helical spring interposed between and mounted coaxially over said stop member and said control valve and compressible by said control valve movement in response to said governor pressure signal, said spring having a rearward end for abutting engagement with a forward face of said cylindrical housing, a forward end for abutting engagement with a rearward shoulder of said control valve, and a spring constant selected as effective to maintain said valve at said normally biased position.

16. The method of claim 15 wherein said cylindrical housing forward face is counterbored for receiving a rearward portion of said helical spring.

17. The method of claim 16 wherein said cylindrical housing is configured to be received by a transmission housing adapted to receive a vacuum modulator.

18. The method of claim 17 further comprising an O-ring formed of an elastomeric material mountable over said cylindrical housing and compressible between said cylindrical housing and said transmission housing when said cylindrical housing is received by said transmission housing.

19. The method of claim 17 wherein said control valve is a modulator valve.

20. The method of claim 15 wherein said governor comprises:
   a cylindrical regulator valve having a rearward end and movable to preselect positions for regulating the flow of said hydraulic fluid to said control valve to provide said pressure signal;
   a pair of opposing lever arms rotatable about an axis at an angular velocity proportional to the speed of said vehicle, each said lever arm having a forward end and a rearward end abuttingly engaging said regulator valve rearward end for moving said regulator valve to said preselect positions when said lever arms are actuated;
   a pivot pin for each said lever arm disposed intermediate said forward and said rearward end, each said lever arm actuable about said pivot pin from a normally biased position to move said regulator valve to said preselect positions;
   a flyweight mounted on each said lever arm having a mass selected as effective for deriving a centrifugal force when said lever arms are rotated to actuate said lever arms about said pivots; and
   a spring attached to each said lever arm having a spring constant selected as effective for normally maintaining said lever arms at said normally biased position defining a regulator valve first position and extensible in response to said centrifugal force derived by said flyweights to maintain said lever arms at a second position defining a regulator valve second position, said regulator valve second position providing a flow of said hydraulic fluid to said control valve effective for developing said pressure effective for actuating said gear shift elements at said preselect vehicle speed.

* * * * *